United States Patent
Lengeling et al.

(10) Patent No.: US 7,549,131 B2
(45) Date of Patent: Jun. 16, 2009

(54) METHOD OF CONTROLLING MOVEMENT OF A CURSOR ON A SCREEN AND A COMPUTER READABLE MEDIUM CONTAINING SUCH A METHOD AS A PROGRAM CODE

(75) Inventors: Gerhard Lengeling, Hamburg (DE); Chris Adam, Norderstedt (DE)

(73) Assignee: Apple Inc., Cupertino, CA (US)

( * ) Notice: Subject to any disclaimer, the term of this patent is extended or adjusted under 35 U.S.C. 154(b) by 647 days.

(21) Appl. No.: 10/334,762

(22) Filed: Dec. 31, 2002

(65) Prior Publication Data

US 2004/0125083 A1 Jul. 1, 2004

(51) Int. Cl.
*G06F 3/00* (2006.01)

(52) U.S. Cl. .................. 715/856; 345/473; 345/157

(58) Field of Classification Search .......... 715/856
See application file for complete search history.

(56) References Cited

U.S. PATENT DOCUMENTS

| | | | | |
|---|---|---|---|---|
| 5,068,802 A * | 11/1991 | Miyashita et al. | ............ | 345/619 |
| 5,397,865 A * | 3/1995 | Park | ............ | 178/18.05 |
| 5,636,297 A * | 6/1997 | Eller et al. | ............ | 382/293 |
| 5,642,131 A * | 6/1997 | Pekelney et al. | ............ | 715/862 |
| 6,275,214 B1 * | 8/2001 | Hansen | ............ | 345/158 |
| 6,765,559 B2 * | 7/2004 | Hayakawa | ............ | 345/173 |
| 6,876,766 B2 * | 4/2005 | Gorbatov et al. | ............ | 382/202 |
| 6,894,678 B2 * | 5/2005 | Rosenberg et al. | ............ | 345/157 |
| 2004/0027397 A1 * | 2/2004 | Sato | ............ | 345/863 |

OTHER PUBLICATIONS

Microsoft, Paint, 1981-2001, Software.*

* cited by examiner

*Primary Examiner*—Stephen S Hong
*Assistant Examiner*—Ryan F Pitaro
(74) *Attorney, Agent, or Firm*—Blakely, Sokoloff, Taylor & Zafman LLP

(57) ABSTRACT

The present invention relates to a method of controlling movement of a cursor on a screen and a computer readable medium containing such a method as a program code.

When using a graphic program which displays data in a graphical manner, it is often difficult to maintain control of the cursor. In particular, when a user attempts to draw a straight line using the cursor, it is difficult to control the cursor sufficiently accurately. The consequence is often not a straight line but one with steps of one or more pixels.

Thus, the present invention is related to a method of controlling movement of a cursor on a screen, comprising:
determining an initial position of said cursor; wherein the improvement lies in defining at least one corridor which includes said initial position;
monitoring movement of said cursor to determine whether a final position of said cursor rests within the corridor, and
displaying said movement as a line on said screen.

32 Claims, 6 Drawing Sheets

METHOD OF CONTROLLING MOVEMENT OF A CURSOR ON A SCREEN AND A COMPUTER READABLE MEDIUM CONTAINING SUCH A METHOD AS A PROGRAM CODE

FIELD OF THE INVENTION

The present invention relates to a method of controlling movement of a cursor on a screen and a computer readable medium containing such a method as a program code. In particular, but not limited thereto, the present invention relates to a method implemented by a computer program for controlling movement of a cursor on a screen which is being used to display graphical data.

BACKGROUND OF THE INVENTION

Computer systems almost exclusively include a screen for displaying data. Highlighting of that data or control of the computer system is in part achieved through the use of a cursor. The cursor is moved through the use of a mouse or roller ball connected to the computer system. A user uses the mouse or roller ball to move the cursor. Many computer systems allow the cursor to move unfettered across the whole of the screen.

When using a graphic program which displays data in a graphical manner, it is often difficult to maintain control of the cursor. In particular, when a user attempts to draw a straight line using the cursor, it is difficult to control the cursor sufficiently accurately. The consequence is often not a straight line but one with steps of one or more pixels.

Hitherto, it has been proposed to control the cursor by locking movement of the cursor in a straight line. Such control has been provided using keyboard control or menu control. However, this type of control is cumbersome. First of all, a user must implement the locking control by using the keyboard or using an option from the menu. Secondly, locking the cursor does not allow interactive variations to determine whether a straight line is required or not because the cursor may only be used to display a straight line.

SUMMARY OF THE INVENTION

The present invention thus relates to a method of controlling movement of a cursor on a screen. The present invention may be implemented in any number of ways including a method, a computer readable medium containing a program code according to the method and a computer system.

Thus, the present invention relates to a method of controlling movement of a cursor on a screen, comprising
determining an initial position of said cursor; wherein the improvement lies in defining at least one corridor which includes said initial position;
monitoring movement of said cursor to determine whether a final position of said cursor rests within the corridor, and
displaying said movement as a line on said screen.

In a preferred embodiment there are two corridors, coterminous with each other with the initial position where the two corridors coterminate.

In another preferred embodiment there are four corridors, coterminous and orthogonal to each other forming an axis with the initial position at the zero axis point.

Preferably said corridors comprise divergent boundaries, said boundaries being defined at an angle of equal to or less than 2 degrees.

Preferably said corridor is substantially parallel to the perimeter of the screen. In a one embodiment the corridor may be defined at an angle to the perimeter of the screen which is not equal to 0, 90 or 180 degrees.

Most preferably, the screen is used to display graphical data.

The present invention also relates to a method of controlling movement of a cursor on a screen, comprising
determining an initial position of said cursor; wherein the improvement lies in defining four corridors, coterminous and orthogonal to each other forming an axis with the initial position at the zero axis point;
monitoring movement of said cursor to determine whether a final position of said cursor rests within the corridor, and
displaying said movement as a line on said screen.

The present invention also relates to a computer readable medium containing a program code for controlling movement of a cursor on a screen, comprising
determining an initial position of said cursor; wherein the improvement lies in defining at least one corridor which includes said initial position;
monitoring movement of said cursor to determine whether a final position of said cursor rests within the corridor, and
displaying said movement as a line on said screen.

The present invention also includes in a computer system including a disc drive incorporating a system computer program, a display having a screen electrically connected to said disc drive, said screen including a cursor for indicating data on the screen and a method of controlling said cursor comprising:
determining an initial position of said cursor; wherein the improvement lies in defining at least one corridor which includes said initial position;
monitoring movement of said cursor to determine whether a final position of said cursor rests within the corridor, and
displaying said movement as a line on said screen.

BRIEF DESCRIPTION OF THE DRAWINGS

Embodiments of the present invention will now be described by way of further example only and with reference to the accompanying drawings, in which.

DETAILED DESCRIPTION

Figure 1:
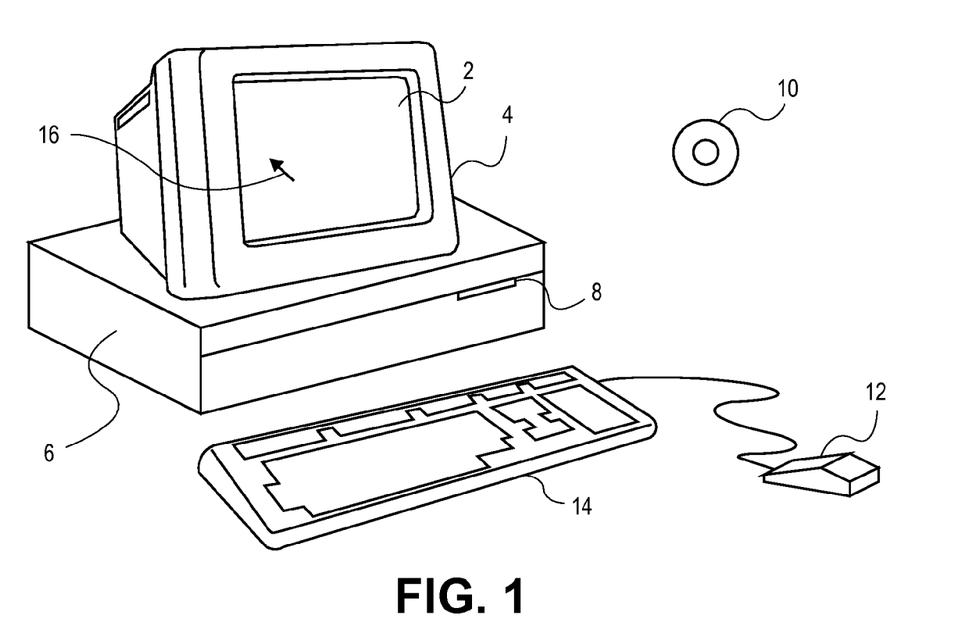
FIG. 1 illustrates a computer system which may be used in accordance with the present invention.

FIG. 1 illustrates a computer system which may be used in accordance with the present invention. The computer system comprises a screen 2 on a display monitor 4 which is connected to a hard disc drive 6 incorporating a temporary drive such as a CD-ROM, DVD, optical disc or floppy disc drive 8 in which is inserted a suitable data medium 10. The computer system also includes a mouse 12 and keyboard 14 both connected electrically to the hard disc drive. Other variations of the computer system can be envisaged. For example the use of a joystick or roller ball or stylus pen and/or a plurality of temporary and hard disc drives and/or connection of the computer system to the Internet and/or application of the computer system in a specific application such as a GPS system in a car which may not include a keyboard or mouse but rather input buttons and menus on the screen.

The hard disc drive typically is utilized to store and retrieve system computer programs for implementing the computer system and other computer programs. The hard disc drive and or temporary disc drives may be used to store data and/or other computer programs. The system computer programs enables the data to be displayed and the user to add, delete or modify that data using the mouse 12, keyboard 14 or other means of control such as a joystick, roller ball or stylus pen.

The data is displayed on the screen 2. A particular piece of data is identified on the screen through the use of a cursor 16. The cursor 16 may be controlled through the use of the mouse 12, keyboard 14 or other means of control such as a joystick, roller ball or stylus pen. System computer programs are provided to provide the control between the mouse 12, keyboard 14 or other means of control such as a joystick, roller ball or stylus pen and the movement of the cursor.

As noted previously, when using graphical data, it is difficult to control the cursor with sufficient accuracy to effect movement in a straight line.

Figure 2:
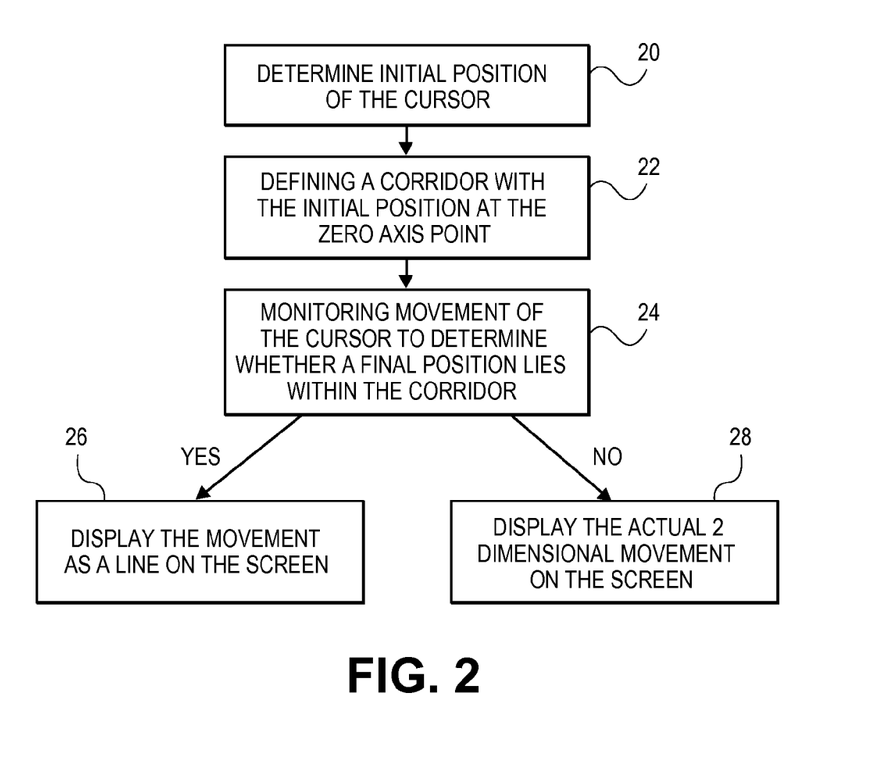
FIG. 2 illustrates a flow chart of a method of controlling movement of a cursor on a screen according to the present invention.

The present invention relates to a method of controlling movement of the cursor on the screen. FIG. 2 is a flow chart illustrating that method. In the first step 20, an initial position of the cursor is determined. This may be by defining the cursor as stationary for a period of time, typically 1 second. The method may determine the period of time or this may be determined by the user. The system computer program incorporates a clock for monitoring the period of time. Alternatively, additional control on the mouse or keyboard may be provided. For example, the other button on the mouse or one of the buttons on the keyboard. Alternatively, there may be no time period or additional control but rather the method is activated whenever the cursor rests within part of the screen used to display graphic data.

The initial position is stored in a memory of the hard disc drive for retrieval by the method subsequently.

Figure 3:
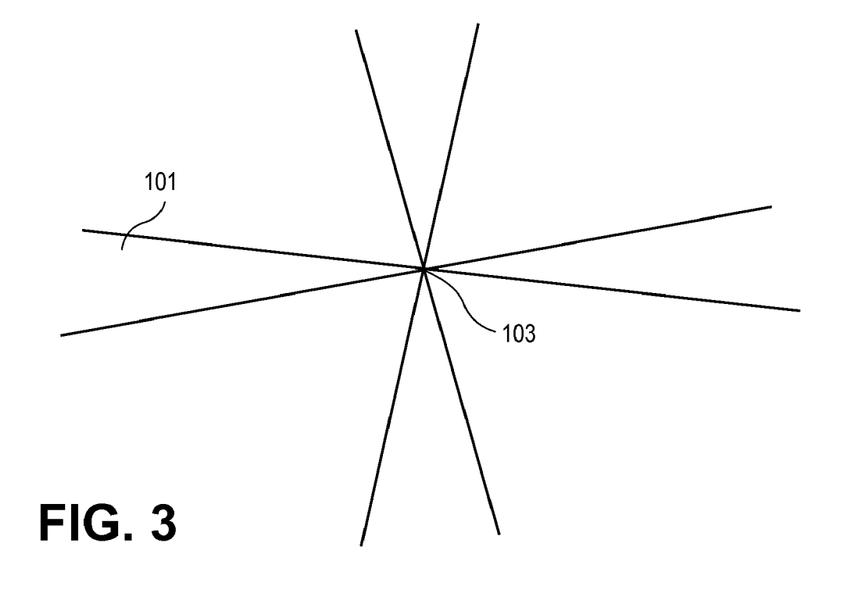
FIG. 3 illustrates the method defining corridors according to the present invention.

The second step 22 is to define a corridor or several corridors 101 as shown in FIG. 3. The corridor 101 or corridors include the initial position 103. In FIG. 3, four corridors are shown which are orthogonal to each other with the initial position 103 at the zero point axis.

The third step 24 is to determine whether the final position of the cursor lies within the corridor. The final position may be determined in the same way as the initial position. That is to say, defining the cursor as stationary for a period of time, typically 1 second. Alternatively, additional control on the mouse or keyboard may be provided. For example, the other button on the mouse or one of the buttons on the keyboard. Alternatively, there may be no time period or additional control but rather the final position is determined whenever the cursor leaves part of the screen used to display graphic data.

Figure 4:
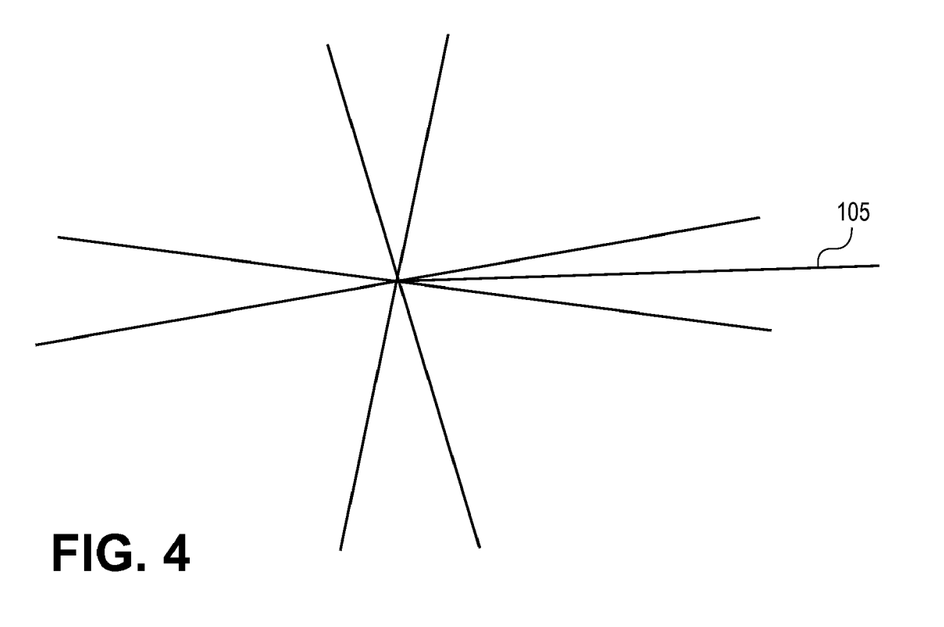
FIG. 4 illustrates the display of a straight line according to the present invention.

The intention is that if the final position is determined to be within the corridor, then a straight line 105 is assumed as shown in FIG. 4.

Figure 5:
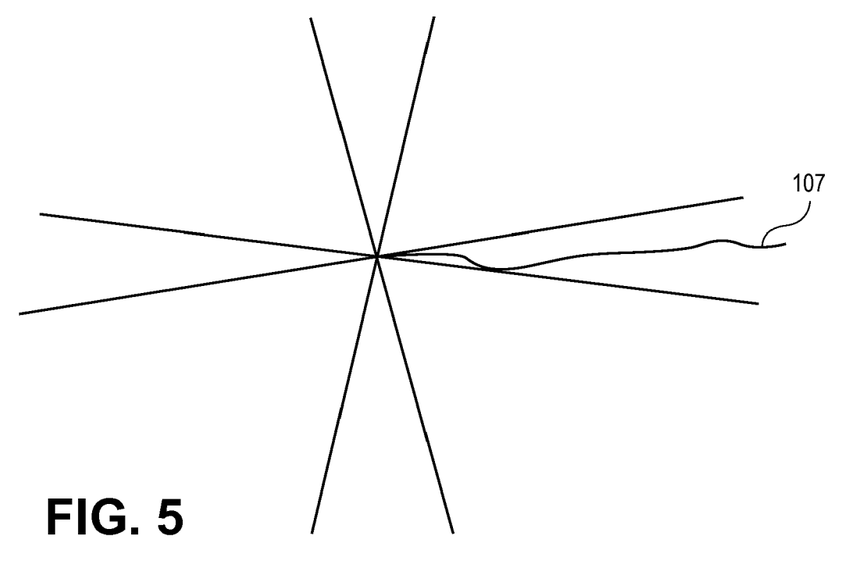
FIG. 5 illustrates movement of the cursor according to the present invention.
Figure 6:
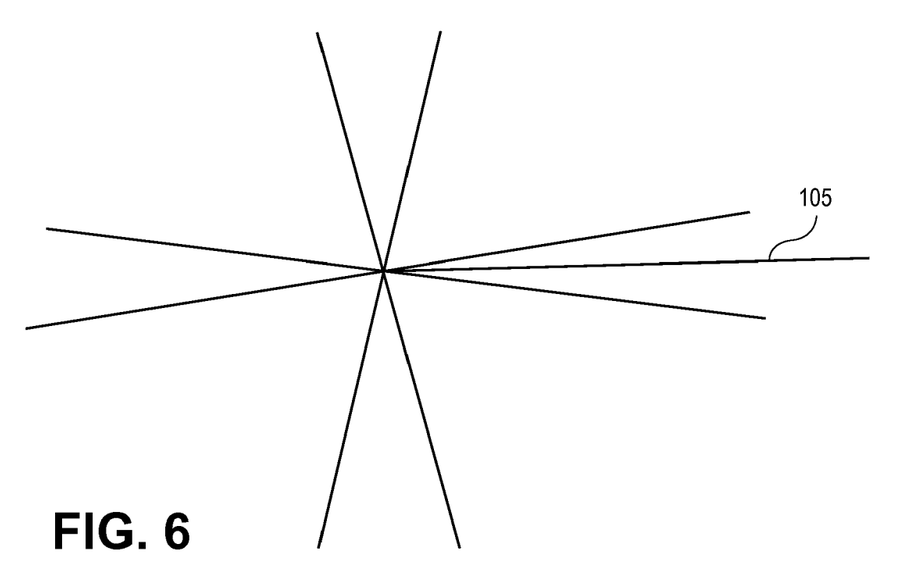
FIG. 6 illustrates the display of a straight line according to the present invention.
Figure 7:
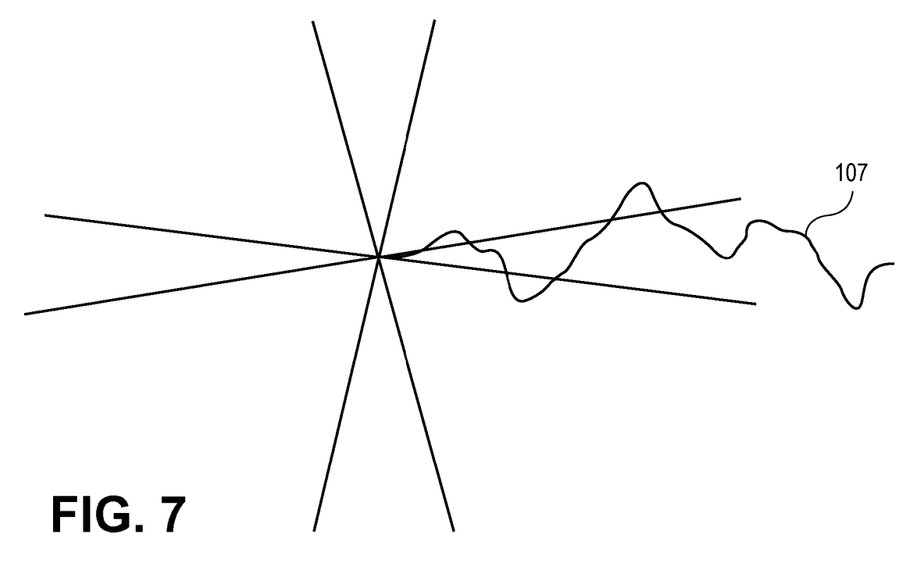
FIG. 7 illustrates movement of the cursor according to the present invention.
Figure 8:
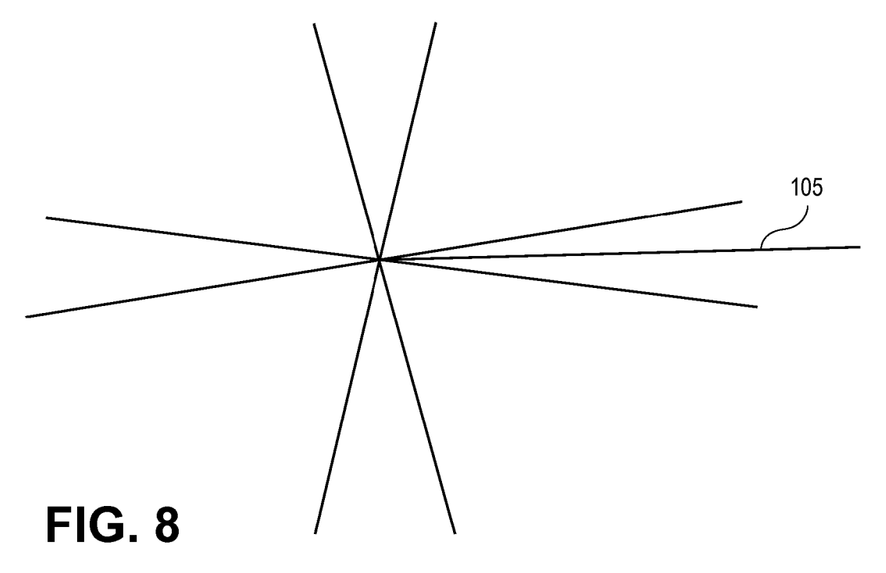
FIG. 8 illustrates the display of a straight line according to the present invention.

Thus, if the result of method step 24 is yes, then method step 26 enables the movement to be displayed as a straight line 105. FIG. 5 illustrates movement 107 of the cursor when it always remains in the corridor. In this case, a straight line is assumed and FIG. 6 illustrates the display of the straight line 105. In addition, the movement 107 of the cursor may go outside the corridor but the final position rests inside the corridor as shown in FIG. 7. Again, a straight line is assumed and FIG. 8 illustrates the display of the straight line.

Figure 9:
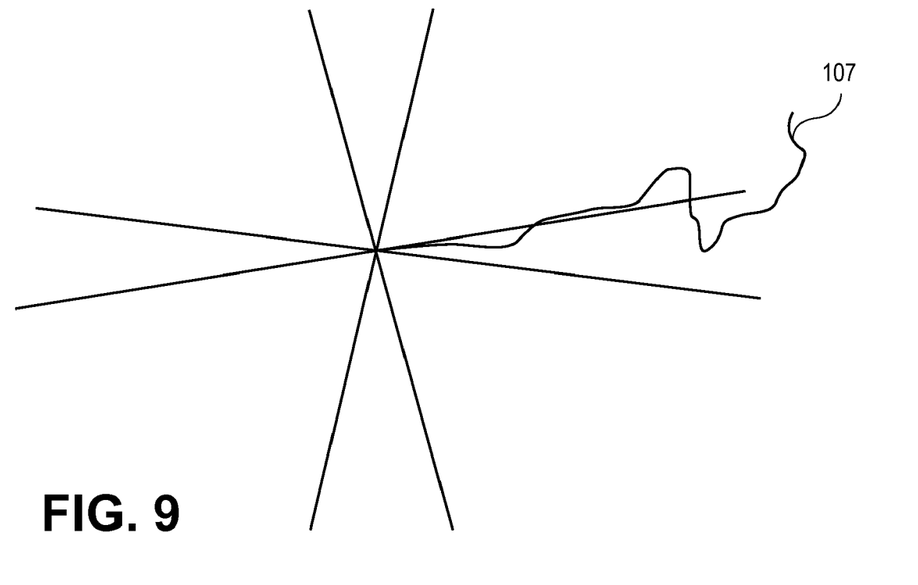
FIG. 9 illustrates movement of the cursor according to the present invention.
Figure 10:
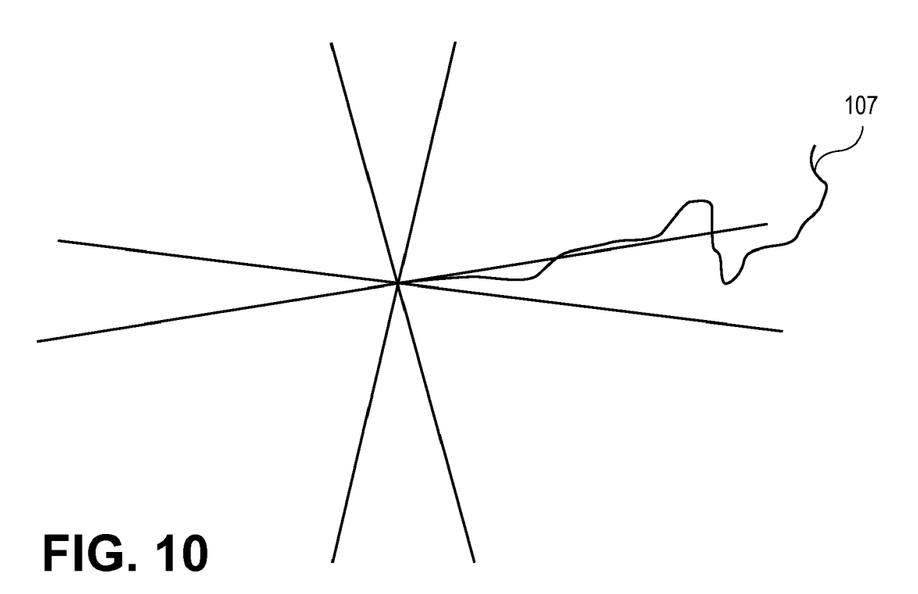
FIG. 10 illustrates the display of the cursor according to the present invention.

If the result of method step 24 is no, then method step 28, enables the movement to be displayed as the actual 2-dimensional movement. FIG. 9 illustrates the movement of the cursor 107 and FIG. 10 illustrates the display which is exactly the movement 107 of the cursor.

An alternative embodiment involves a variation of steps 22 and 24. In this case, mouse control or keyboard control is implemented and this determines the start position. Whilst the cursor is moved and the mouse control or keyboard control is activated, then the movement of the cursor is monitored. However, whenever the mouse control or keyboard control is disabled, then this determines the final position for evaluating potential straight line movement, irrespective of whether the cursor is continuously moved. As in the preferred embodiment, if the final position rests within the corridor, then single axis movement is assumed and displayed regardless of whether the movement of the cursor previously went outside of the corridor.

A further embodiment comprises a further variation of step 24. In this embodiment, the movement of the cursor is monitored and if the movement rests within the corridor, then straight line movement is assumed and displayed. If the cursor moves outside the corridor, then the straight line function is disabled and the true movement of the cursor is displayed. This embodiment thus does not rely upon a final position of the cursor but rather provides real time interactive display of the cursor movement with enhanced straight line control.

The aforegoing method is implemented as program code. The program code may be included in the system computer programs or a computer program relating to a particular graphic program.

FIGS. 3 to 10 illustrate corridors 101 which are divergent corridors. The corridors need not be divergent and may comprise parallel boundaries.

In addition, the corridors are illustrated with boundaries diverging at an angle of 5 to 10 degrees. In most graphic programs, this is likely to be too great an angle and it is envisaged that an angle of 1 or 2 degrees is to be preferred.

Figure 11:
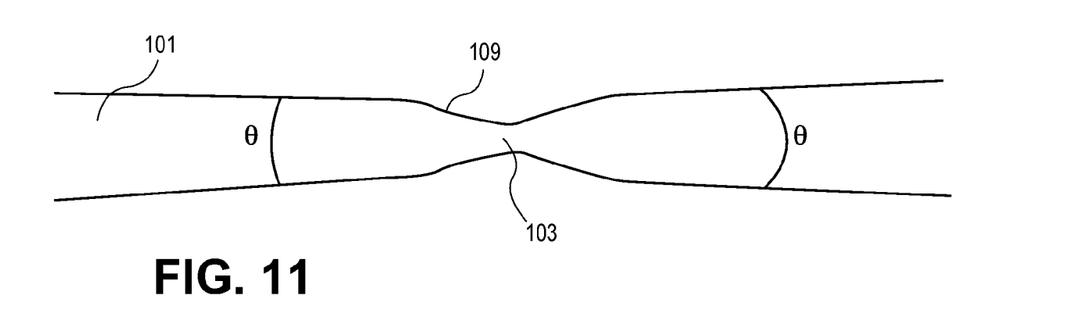
FIG. 11 shows schematically an enlarged view of two corridors coterminating according to the present invention.
Figure 12:
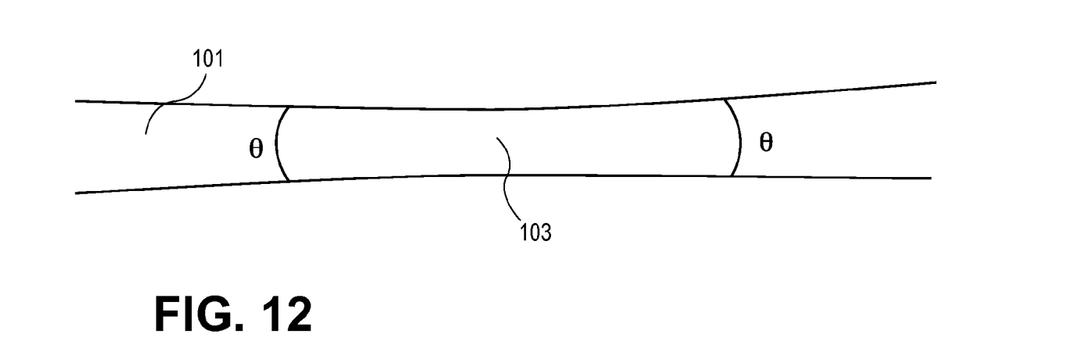
FIG. 12 shows schematically an enlarged view of two corridors coterminating according to the present invention.

Whenever the boundaries are divergent, it is preferred that the boundaries do not meet at a point so as to allow the user small variations when first moving the cursor. FIGS. 11 and 12 show schematically enlarged views of two corridors coterminating. The initial position 103 is located where the two corridors 101 terminate. The boundaries of the corridors diverge at an angle θ of 1 or 2 degrees. In FIG. 11, the boundaries converge to a neck portion 109 whereas there is no such neck portion in FIG. 12.

Furthermore, the corridors illustrated in FIGS. 3 to 10 are shown approximately parallel to the screen 2. It is envisaged that the corridors may be translated relative to the screen. For example, the corridors may be translated by 45°. The position of the corridors being translated by 45° may enhance control of the cursor when displaying sin or cos wave data.

The embodiment described above includes four corridors. It should be noted that only one corridor may be used. Alternatively, 2, 3 or more corridors may be defined depending upon the graphic program. For example, 8 corridors may be defined; a first set of four corridors orthogonal to each other, a second set of four corridors orthogonal to each other with the first set and second set translated by 45° to each other. If the graphic program is able to display data in 3-dimensions, then 6 corridors could be provided, each orthogonal to each other.

Moreover, the initial position has been defined as the zero axis point. The initial position may not lie at the zero axis point but determining whether the cursor movement may be intended to be a straight line may be more complicated.

The present invention is particularly directed towards the display of graphic data. Such data may comprise audio and/or video signals being displayed by a graphic program as a function of time. The present invention thus enables components of the audio and/or video signals to be varied whilst maintaining the same point in time.

The aforegoing description has been given by way of example only and it will be appreciated by a person skilled in the art that modifications can be made without departing from the scope of the present invention.

What is claimed is:

1. A method of controlling movement of a cursor on a screen, comprising:
    determining an initial position of said cursor;
    defining at least one corridor based on said initial position;
    monitoring movement and a current position of said cursor, wherein said monitoring occurs in real time;
    displaying a first visual indicator when the current position of the cursor is within one of the at least one corridor and wherein displaying the first visual indicator occurs in real time and wherein the first visual indicator indicates that the current position of the cursor is within the one of the at least one corridor and wherein the first visual indicator is an interactive straight line extending from the initial position;
    displaying a second visual indicator when the current position of the cursor is outside the at least one corridor and wherein displaying the second visual indicator occurs in real time and wherein the second visual indicator indicates that the current position of the cursor is outside the at least one corridor;
    displaying said movement as a first straight line on said screen upon determining a final position of said cursor rests within the one of at least one corridor; and
    displaying said movement as actual movement on said screen upon determining the final position of said cursor rests outside the at least one corridor, wherein displaying said movement as actual movement is placing a permanent visible element where said cursor moves between said initial position and said final position.

2. A method as claimed in claim 1, in which there are two corridors, coterminous with each other with the initial position where the two corridors coterminate.

3. A method as claimed in claim 1, in which there are four corridors, coterminous and orthogonal to each other forming an axis with the initial position at the zero axis point.

4. A method as claimed in any one of claims 1, 2 or 3, in which said corridors comprise divergent boundaries, said boundaries being defined at an angle of equal to or less than 2 degrees.

5. A method as claimed in claim 1, in which said determining said initial position includes monitoring a control of said cursor to ascertain whether said control has been activated.

6. A method as claimed in claim 5, in which said monitoring of said movement of said cursor to determine whether a final position of said cursor rests within the corridor includes monitoring said control to ascertain whether said control has been disabled.

7. A method as claimed in claim 1, in which said corridor is substantially parallel to the perimeter of the screen.

8. A method as claimed in claim 7, in which said corridor may be defined at an angle to the perimeter of the screen which is not equal to 0, 90 or 180 degrees.

9. A method as claimed in claim 1, in which said screen is used to display graphical data.

10. A method as claimed in claim 1, in which the first visual indicator displays a plurality of lines along the at least one corridor, wherein the plurality of lines indicate locations of the at least one corridor.

11. A method of controlling movement of a cursor on a screen, comprising:
    determining an initial position of said cursor;
    defining four corridors, coterminous and orthogonal to each other forming an axis with the initial position at a zero axis point;
    monitoring movement and a current position of said cursor, wherein said monitoring occurs in real time;
    displaying a first visual indicator when the current position of the cursor is within one of the four corridors and wherein displaying the first visual indicator occurs in real time and wherein the first visual indicator indicates that the current position of the cursor is within the one of the four corridors and wherein the first visual indicator is an interactive straight line extending from the initial position;
    displaying a second visual indicator when the current position of the cursor is outside the four corridors and wherein displaying the second visual indicator occurs in real time and wherein the second visual indicator indicates that the current position of the cursor is outside the four corridors;
    displaying said movement as a first straight line on said screen upon determining that a final position of said cursor rests within the one of the four corridors; and
    displaying said movement as actual movement on said screen upon determining that the final position of said cursor rests outside the four corridors, wherein displaying said movement as actual movement is placing a permanent visible element where said cursor moves between said initial position and said final position.

12. A method as claimed in claim 11, in which said corridors comprise divergent boundaries, said boundaries being defined at an angle of equal to or less than 2 degrees.

13. A method as claimed in claim 12, in which said zero axis point is equal to or greater than 1 pixel by 1 pixel of said screen.

14. A method as claimed in claim 11, in which said determining said initial position includes monitoring a control of said cursor to ascertain whether said control has been activated.

15. A method as claimed in claim 14, in which said monitoring of said movement of said cursor to determine whether a final position of said cursor rests within the corridor includes monitoring said control to ascertain whether said control has been disabled.

16. A method as claimed in claim 11, in which said screen is used to display graphical data.

17. A method as claimed in claim 11, in which the first visual indicator displays a plurality of lines along the four corridors, wherein the plurality of lines indicate locations of the four corridors.

18. A computer readable medium containing a program which when executed by a data processing system causes the data processing system to perform a method for controlling movement of a cursor on a screen, the method comprising:
   determining an initial position of said cursor;
   defining at least one corridor which includes said initial position;
   monitoring movement and a current position of said cursor, wherein said monitoring occurs in real time;
   displaying a first visual indicator when the current position of the cursor is within one of the at least one corridor and wherein displaying the first visual indicator occurs in real time and wherein the first visual indicator indicates that the current position of the cursor is within the one of the at least one corridor and wherein the first visual indicator is an interactive straight line extending from the initial position;
   displaying a second visual indicator when the current position of the cursor is outside the at least one corridor and wherein displaying the second visual indicator occurs in real time and wherein the second visual indicator indicates that the current position of the cursor is outside the at least one corridor;
   displaying said movement as a first straight line on said screen upon determining a final position of said cursor rests within the one of the at least one corridor; and
   displaying said movement as actual movement on said screen upon determining the final position of said cursor rests outside the at least one corridor, wherein displaying said movement as actual movement is placing a permanent visible element where said cursor moves between said initial position and said final position.

19. A computer readable medium as claimed in claim 18, in which there are two corridors, coterminous with each other with the initial position where the two corridors coterminate.

20. A computer readable medium as claimed in claim 18, in which there are four corridors, coterminous and orthogonal to each other forming an axis with the initial position at the zero axis point.

21. A computer readable medium as claimed in any one of claims 18, 19 or 20, in which said corridors comprise divergent boundaries, said boundaries being defined at an angle of equal to or less than 2 degrees.

22. A computer readable medium as claimed in claim 18, in which said screen is used to display graphical data.

23. A computer readable medium as claimed in claim 18, in which the first visual indicator displays a plurality of lines along the at least one corridor, wherein the plurality of lines indicate locations of the at least one corridor.

24. In a computer system including a disc drive incorporating a system computer program, a display having a screen electrically connected to said disc drive, said screen including a cursor for indicating data on the screen, said computer system comprising:
   means for determining an initial position of said cursor;
   means for defining at least one corridor which includes said initial position;
   means for monitoring movement and a current position of said cursor, wherein said monitoring occurs in real time;
   means for displaying a first visual indicator when the current position of the cursor is within one of the at least one corridor and wherein displaying the first visual indicator occurs in real time and wherein the first visual indicator indicates that the current position of the cursor is within the one of the at least one corridor and wherein the first visual indicator is an interactive straight line extending from the initial position;
   means for displaying a second visual indicator when the current position of the cursor is outside the at least one corridor and wherein displaying the second visual indicator occurs in real time and wherein the second visual indicator indicates that the current position of the cursor is outside the at least one corridor;
   means for displaying said movement as a first straight line on said screen upon determining a final position of said cursor rests within the one of the at least one corridor; and
   means for displaying said movement as actual movement on said screen upon determining the final position of said cursor rests outside the at least one corridor, wherein displaying said movement as actual movement is placing a permanent visible element where said cursor moves between said initial position and said final position.

25. A method of controlling a display, comprising:
   determining an initial position of a cursor in response to activation of a control;
   displaying actual movement of the cursor while the control is activated, the actual movement comprises a displayed sketch which shows the actual movement of the cursor beginning from the initial position to a current position of the cursor;
   displaying a visual indicator in response to the current position of the cursor, wherein the visual indicator has a first appearance when the current position is in a first configuration relative to the initial position and wherein the visual indicator has a second appearance when the current position is in a second configuration relative to the initial position and wherein displaying the visual indicator occurs in real time and wherein the first appearance of the visual indicator is removing the displayed sketch and displaying an interactive straight line extending from the initial position;
   determining a final position of the cursor in response to deactivation of the control;
   removing the displayed sketch from the display and displaying a first straight line when the final position is in the first configuration relative to the initial position;
   leaving the displayed sketch on the display when the final position is in the second configuration relative to the initial position.

26. A method as in claim 25 wherein the final position of the cursor is in the first configuration relative to the initial position when the final position is inside of a defined corridor.

27. A method as in claim 26 wherein the final position of the cursor is in the second configuration relative to the initial position when the final position is outside of the defined corridor and wherein the second appearance is leaving the displayed sketch on the display.

28. A method as in claim 27 wherein the cursor is controlled by a user's control of a device.

29. A computer readable medium containing a program which when executed by a data processing system causes the data processing system to perform a method for controlling a display, the method comprising:

determining an initial position of a cursor in response to activation of a control;

displaying actual movement of the cursor while the control is activated, the actual movement comprises a displayed sketch which shows the actual movement of the cursor beginning from the initial position to a current position of the cursor;

displaying a visual indicator in response to the current position of the cursor, wherein the visual indicator has a first appearance when the current position is in a first configuration relative to the initial position and wherein the visual indicator has a second appearance when the current position is in a second configuration relative to the initial position and wherein displaying the visual indicator occurs in real time and wherein the first appearance of the visual indicator is removing the displayed sketch and displaying an interactive straight line extending from the initial position; and     determining a final position of the cursor in response to deactivation of the control;

removing the displayed sketch from the display and displaying a straight line when the final position is in the first configuration relative to the initial position;

leaving the displayed sketch on the display when the final position is in the second configuration relative to the initial position.

30. A computer readable medium as claimed in claim 29, wherein the final position of the cursor is in the first configuration relative to the initial position when the final position is inside of a defined corridor.

31. A computer readable medium as claimed in claim 30, wherein the final position of the cursor is in the second configuration relative to the initial position when the final position is outside of the defined corridor.

32. A computer readable medium as claimed in claim 31, wherein the cursor is controlled by a user's control of a device.

* * * * *